US011868084B2

(12) United States Patent
Abe

(10) Patent No.: US 11,868,084 B2
(45) Date of Patent: Jan. 9, 2024

(54) IMAGE FORMING APPARATUS WITH FAN SPEED CONTROL

(71) Applicant: BROTHER KOGYO KABUSHIKI KAISHA, Nagoya (JP)

(72) Inventor: Koji Abe, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/829,526

(22) Filed: Jun. 1, 2022

(65) Prior Publication Data

US 2022/0390893 A1 Dec. 8, 2022

(30) Foreign Application Priority Data

Jun. 4, 2021 (JP) ................................ 2021-094752

(51) Int. Cl.

| | |
|---|---|
| ***G03G 21/00*** | (2006.01) |
| ***G03G 21/20*** | (2006.01) |
| ***G03G 21/16*** | (2006.01) |
| *G03G 15/20* | (2006.01) |
| *G03G 15/00* | (2006.01) |

(52) U.S. Cl.

CPC ....... *G03G 21/206* (2013.01); *G03G 21/1633* (2013.01); *G03G 15/205* (2013.01); *G03G 15/2017* (2013.01); *G03G 15/5045* (2013.01); *G03G 2221/1645* (2013.01); *G03G 2221/1687* (2013.01)

(58) Field of Classification Search

CPC ............. G03G 15/2017; G03G 15/205; G03G 15/5045; G03G 21/1633; G03G 21/206; G03G 2215/00084; G03G 2221/1645; G03G 2221/1687

USPC ........................................... 399/92, 110, 124

See application file for complete search history.

(56) References Cited

U.S. PATENT DOCUMENTS

2004/0197108 A1* 10/2004 Yamagata .......... H04N 1/32609 399/92
2007/0009283 A1* 1/2007 Shirakata ............. G03G 21/206 399/92
2009/0208237 A1 8/2009 Yasuda
2015/0198918 A1 7/2015 Sakagushi et al.
2016/0274522 A1 9/2016 Yamamoto et al.
(Continued)

FOREIGN PATENT DOCUMENTS

JP 2004-109168 A 4/2004
JP 2009-180917 A 8/2009
(Continued)

*Primary Examiner* — Robert B Beatty
(74) *Attorney, Agent, or Firm* — Merchant & Gould P.C.

(57) ABSTRACT

An image forming apparatus includes a housing having an opening, a cover configured to open the opening in an open state and to close the opening in a close state, a photosensitive drum, a heater, a fan configured to force air out of the housing, and a controller. The cover in the open state is configured to allow a sheet with a toner image fixed thereon to be ejected through the opening. The heater is configured to heat a sheet to fix a toner image on the sheet, and is located between the cover in the close state and the photosensitive drum. During execution of a printing process, the controller is configured to cause the fan to rotate at a first speed if the cover is in the closed state, and to rotate at a second speed lower than the first speed if the cover is in the open state.

19 Claims, 7 Drawing Sheets

(56) References Cited

U.S. PATENT DOCUMENTS

| | | | | |
|---|---|---|---|---|
| 2019/0047306 | A1* | 2/2019 | Sasaki | B41J 29/377 |
| 2021/0286318 | A1* | 9/2021 | Okamoto | H04N 1/00084 |

FOREIGN PATENT DOCUMENTS

| | | | | |
|---|---|---|---|---|
| JP | 2012141408 | A | * | 7/2012 |
| JP | 2015-135370 | A | | 7/2015 |
| JP | 2015126424 | A | * | 7/2015 |
| JP | 2016-173537 | A | | 9/2016 |
| JP | 2016164631 | A | * | 9/2016 |
| JP | 2016-224374 | A | | 12/2016 |
| JP | 2018087851 | A | * | 6/2018 |
| JP | 2020-101648 | A | | 7/2020 |

* cited by examiner

IMAGE FORMING APPARATUS WITH FAN SPEED CONTROL

CROSS-REFERENCE TO RELATED APPLICATION(S)

This application claims priority from Japanese Patent Application No. 2021-094752 filed on Jun. 4, 2021, the disclosure of which is incorporated herein by reference in its entirety.

TECHNICAL FIELD

The present disclosure relates to an image forming apparatus including a cover configured to open and close an opening in a housing.

BACKGROUND ART

An image forming apparatus known in the art includes a cover configured to open and close an opening in a housing. This image forming apparatus further includes a fan that forces air out of the housing, and a controller. If a detection temperature of a thermistor for detecting a temperature of a fixing unit is above a threshold, the controller causes the fan to rotate at a high speed after a printing process is started. If the detection temperature is below the threshold, the controller causes the fan to rotate at a low speed lower than the high speed during a predetermined time period after the printing process is started, and to rotate at the high speed after the lapse of the predetermined time period. If the cover (rear cover) is open, the controller always causes the fan to rotate at the high speed during the printing process.

SUMMARY

If the fan is caused to rotate at a high speed when a cover is open, a large quantity of air will flow into the housing through the opening. This may cause air flowing into the housing through the opening to heat up while flowing past the vicinity of the fixing unit, and the thus-heated air would possibly flow into the process unit and cause the process unit that transfers a toner image on a sheet to heat up to a high temperature.

It would be desirable to provide an image forming apparatus in which a rise in temperature of the process unit can be restrained.

In one aspect, an image forming apparatus disclosed herein comprises a housing having an opening, a cover, a photosensitive drum, a heater, a fan, and a controller. The cover is configured to open the opening in an open state and to close the opening in a close state. The cover in the open state is configured to allow a sheet with a toner image fixed thereon to be ejected through the opening. The photosensitive drum is configured to form a toner image onto a sheet. The heater is configured to heat the sheet to fix the toner image on the sheet. The heater is located between the cover in the close state and the photosensitive drum. The fan is configured to force air out of the housing. The controller is configured to execute a printing process for forming a toner image on a sheet. During execution of the printing process, the controller is configured to cause the fan to rotate at a first speed if the cover is in the closed state, and to rotate at a second speed lower than the first speed if the cover is in the open state.

In another aspect, an image forming apparatus disclosed herein comprises a housing having an opening, a photosensitive drum, a heater, a cover, a discharge tray, a fan, and a controller. The photosensitive drum is configured to form a toner image onto a sheet. The heater is configured to heat the sheet to fix the toner image on the sheet. The cover is configured to open the opening in an open state and to close the opening in a close state. The cover is configured to eject the sheet with the toner image fixed thereon through the opening when the cover is in the open state. The discharge tray is configured to receive the sheet with the toner image fixed thereon when the cover is in the close state. The fan is configured to force air out of the housing when rotated. The controller is configured to control the fan to rotate at a first speed when the cover closes the opening, and to rotate at a second speed lower than the first speed when the cover opens the opening.

BRIEF DESCRIPTION OF THE DRAWINGS

The above and other aspects, their advantages and further features will become more apparent by describing in detail illustrative, non-limiting embodiments thereof with reference to the accompanying drawings, in which.

DESCRIPTION OF EMBODIMENTS

A detailed description will be given of a first embodiment of an image forming apparatus 1.

Figure 1:
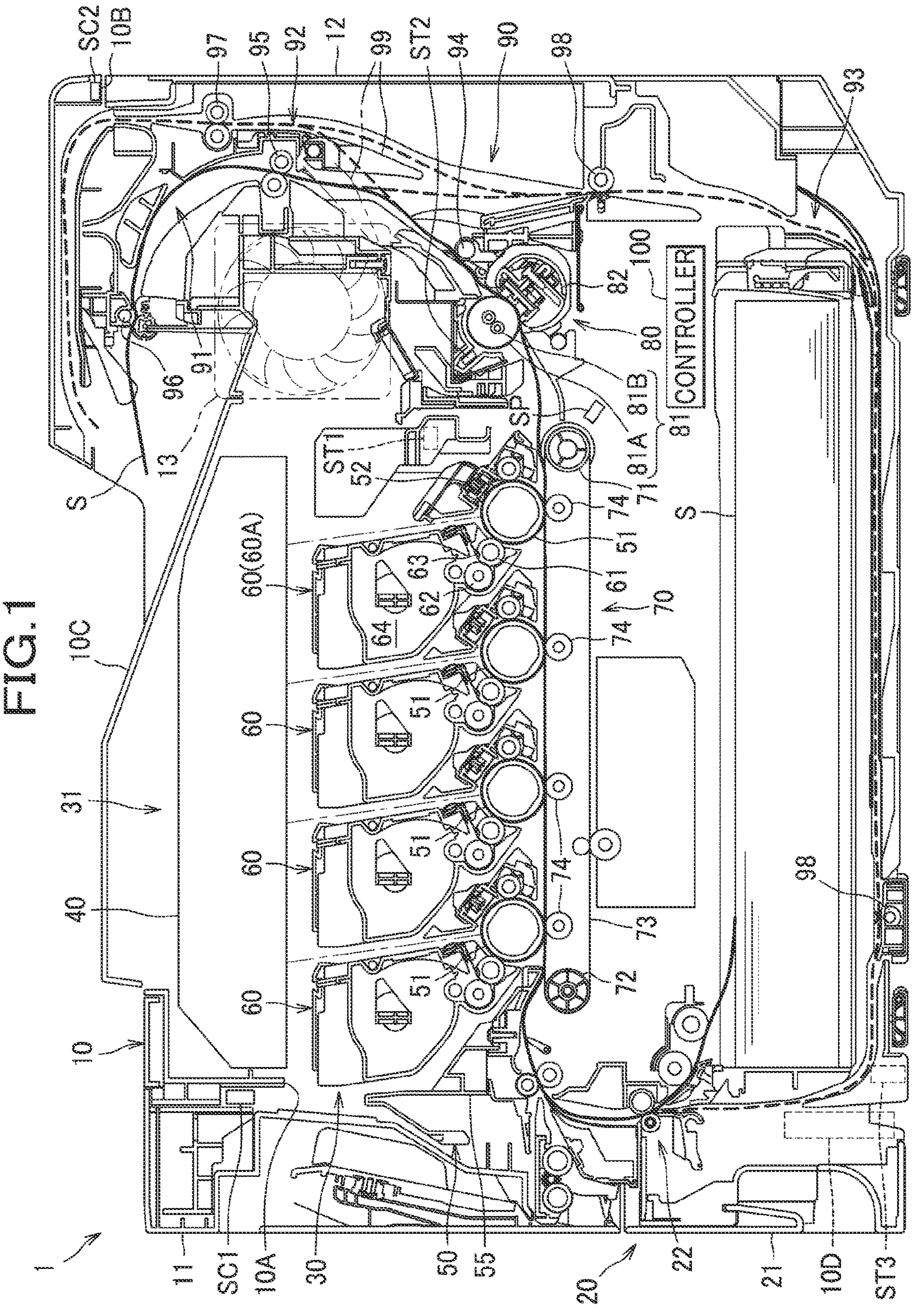
FIG. 1 is a sectional view of an image forming apparatus.

As shown in FIG. 1, the image forming apparatus 1 is a color printer and comprises a housing 10, a front cover 11, a rear cover 12, a feeder unit 20, an image forming unit 30, a conveyance unit 90, and a controller 100. The rear cover 12 is one example of a cover.

The housing 10 comprises a front opening 10A provided in a front portion thereof, and a rear opening 10B provided in a rear portion thereof. The rear opening 10B is one example of an opening. The housing 10 further comprises an output tray 10C provided on a top surface thereof.

The front cover 11 is a cover for opening and closing the front opening 10A. The front cover 11 is rotatably supported on the housing 10 at a lower end thereof. The front cover 11 is rotatable relative to the housing 10 between a close position for closing the front opening 10A and an open positon (not shown) for opening the front opening 10A. The image forming apparatus 1 includes a first open/close sensor SC1 that detects opening and closing of the front cover 11. The controller 100 determines whether the front cover 11 is open or closed based on a detection result of the first open/close sensor SC1.

The rear cover 12 is a cover for opening and closing the rear opening 10B. The rear cover 12 is configured to open the rear opening 10B in an open state and to close the rear opening 10B in a close state. The rear cover 12 is rotatably supported on the housing 10 at a lower end thereof. The rear cover 12 is rotatable relative to the housing 10 between a close position (see also FIG. 6) for closing the rear opening 10B and an open positon (see FIGS. 7A and 7B) for opening the rear opening 10B. The image forming apparatus 1 includes a second open/close sensor SC2 that detects opening and closing of the rear cover 12. The controller 100 determines whether the rear cover 12 is open or closed based on a detection result of the second open/close sensor SC2.

The feeder unit 20 has a function of feeding a sheet S to the image forming unit 30. The feeder unit 20 comprises a sheet tray 21 that holds sheets S, and a feeding mechanism 22. The sheet tray 21 is installable into and removable from the housing 10, and is located in a lower space of the housing 10 when installed in the housing 10. The feeding mechanism 22 separates the sheets S in the sheet tray 21 one from others, and feeds the sheets S one by one to the image forming unit 30.

The image forming unit 30 has a function of forming an image on the sheet S. The image forming unit 30 comprises a process unit 31 for transferring a toner image onto a sheet S, and a fixing unit 80 for fixing the toner image to the sheet S.

The process unit 31 comprises an exposure unit 40, a drum unit 50, four process cartridges 60, and a transfer unit 70.

The exposure unit 40 is provided in an upper space of the housing 10. The exposure unit 40 comprises a light source, a polygon mirror, lenses, a reflector, etc. (not shown). The exposure unit 40 is configured to emit light beams, shown by alternate long and short dashed lines, on the surfaces of photosensitive drums 51, to thereby expose the surfaces of the photosensitive drums 51 to light.

The drum unit 50 is located in the housing 10 between the sheet tray 21 and the exposure unit 40. The drum unit 50 comprises four photosensitive drums 51, four chargers 52, and a support frame 55 for supporting the photosensitive drums 51 and other components. The drum unit 50 is installable into and removable from the housing 10 through the front opening 10A when the front cover 11 is open.

Each process cartridge 60 is removably installed on the drum unit 50. Each process cartridge 60 comprises a development roller 61, a supply roller 62, a doctor blade 63, and a toner container 64.

The transfer unit 70 is located in the housing 10 between the sheet tray 21 and the drum unit 50. The transfer unit 70 comprises a drive roller 71, a follower roller 72, a conveyor belt 73, and four transfer rollers 74. The conveyor belt 73 is looped around and runs between the drive roller 71 and the follower roller 72. The upper surface of the conveyer belt 73 contacts the photosensitive drums 51. Each of the four transfer rollers 74 is positioned on an inner side of the conveyor belt 73 and holds the transfer belt 73 in combination with a corresponding photosensitive drum 51.

The fixing unit 80 is located in the housing 10 rearward of the process unit 31. More specifically, the fixing unit 80 is located between the rear cover 12 in a close state and the process unit 31. The fixing unit 80 comprises a heating portion 81 for heating a sheet S, and a pressure portion 82 that nips the sheet S in combination with the heating portion 81. In this disclosure, the heating portion 81 includes a heating roller 81A, and a heater 81B for heating the heating roller 81A. The pressure portion 82 includes an endless belt, a pressure pad that nips the endless belt in combination with the heating portion 81, a holder that supports the pressure pad, a belt guide (each shown without references characters), etc.

The image forming unit 30 uniformly charges the surface of each photosensitive drum 51 by the corresponding charger 52, and then exposes the surface of the photosensitive drum 51 to light by the exposure unit 40 to form an electrostatic latent image on the surface of the photosensitive drum 51. Further, the image forming unit 30 supplies toner contained in each toner container 64 to the corresponding supply roller 62, and then supplies the toner from the supply roller 62 to the corresponding development roller 61. The toner supplied to the development roller 61 enters the space between the development roller 61 and the corresponding doctor blade 63 as the development roller 61 rotates, and is carried on the development roller 61 as a thin layer having a uniform thickness.

The image forming unit 30 supplies the toner carried on the development roller 61 to the electrostatic latent image formed on the surface of the corresponding photosensitive drum 51 and forms a toner image on the surface of the photosensitive drum 51. Subsequently, the image forming unit 30 conveys a sheet S fed from the feeder unit 20 through between the photosensitive drum 51 and the conveyer belt 73, so that the toner image on the surface of the photosensitive drum 51 is transferred to the sheet S. Thereafter, the image forming unit 30 conveys the sheet S through between the heating portion 81 and the pressure portion 82 to fix the toner image on the sheet S and form an image on the sheet S.

The conveyance unit 90 has a function of conveying a sheet S conveyed from the image forming unit 30 to the outside of the housing 10 or to the image forming unit 30 again. The conveyance unit 90 comprises a first path 91, a second path 92, a third path 93, a first conveyance roller 94, a second conveyance roller 95, a first switchback roller 96, a second switchback roller 97, a plurality of third conveyance rollers 98, and a flapper 99. The second path 92 is formed in part by the rear cover 12 in the close state.

When the conveyance unit 90 conveys a sheet S to the outside of the housing 10 with the rear cover 12 closed, the sheet S conveyed from the image forming unit 30 is conveyed by the first conveyance roller 94, and guided to the first path 91 by the flapper 99. Then, the conveyance unit 90 conveys the sheet S guided to the first path 91, by the second conveyance roller 95 and the first switchback roller 96, and ejects the sheet S onto the output tray 10C.

When the conveyance unit 90 conveys a sheet S to the outside of the housing 10 with the rear cover 12 open, the sheet S conveyed from the image forming unit 30 is conveyed by the first conveyance roller 94, guided rearward by the flapper 99 swung to a position shown by a chain double-dashed line, and ejected through the rear opening 10B onto the rear cover 12 in an open state. The image forming apparatus 1 can form an image on a sheet S even when the rear cover 12 is open. The rear cover 12 in the open state allows a sheet S with an image formed thereon to be ejected through the rear opening 10B.

When the conveyance unit 90 reconveys a sheet S to the image forming unit 30, the sheet S conveyed from the image forming unit 30 is conveyed by the first conveyance roller 94, and guided to the first path 91 or the second path 92 by the flapper 99. If the sheet S is guided to the first path 91, the conveyance unit 90 conveys the sheet S in the first path 91 to the third path 93 by the second conveyance roller 95 and the first switchback roller 96. If the sheet S is guided to the second path 92, the conveyance unit 90 conveys the sheet S in the second path 92 to the third path 93 by the second switchback roller 97.

The sheet S conveyed to the third path 93 is fed to the image forming unit 30 again by the third conveyance roller 98 and the feeding mechanism 22. After an image is formed on the sheet S in the image forming unit 30, the sheet S is ejected on the output tray 10C.

The image forming apparatus 1 further comprises a fan 13, an internal temperature sensor ST1, a fixing temperature sensor ST2, an external temperature sensor ST3, and a patch detection sensor SP.

The fan 13 is configured to force air out of the housing 10 when operated. The housing 10 includes a pair of left and right side frames (not shown). The fan 13 is provided on the right side frame. The fan 13 is located between the process unit 31 and the rear cover 12 in the close state, as viewed from the right or left side. Further, the fan 13 is located above the fixing unit 80, as viewed in the lateral direction. Although not shown, a duct extending in the lateral direction is provided above the fixing unit 80 between the process unit 31 and the rear cover 12 in the close state, and the fan 13 is located on the right side of the duct. The fan 13 can be operated selectively either at a first speed, or at a second speed lower than the first speed. In the following description, the first speed is also referred to as "high speed", and the second speed is also referred to as "low speed".

The internal temperature sensor ST1 detects a temperature inside the housing 10. The internal temperature sensor ST1 is located in the housing 10 in a region between the drum unit 50 and the fixing unit 80. More specifically, the internal temperature sensor ST1 is located between the fixing unit 80 and the process cartridge 60 located in the most downstream position in a conveyance direction of a sheet S (referred to as "process cartridge 60A" in the following description). The internal temperature sensor ST1 is located at a rear portion of the support frame 55. The internal temperature sensor ST1 may, for example, be a thermistor.

The fixing temperature sensor ST2 detects a temperature of the fixing unit 80. More specifically, the fixing temperature sensor ST2 detects a temperature of the heating portion 81. The fixing temperature sensor ST2 is located at the fixing unit 80, opposed to the heating roller 81A, out of contact with the heating roller 81A. The fixing temperature sensor ST2 may, for example, be a non-contact type thermistor.

The external temperature sensor ST3 detects a temperature outside the housing 10. The housing 10 includes an intake opening 10D formed in a front-end lower portion of the left side frame (not shown). The external temperature sensor ST3 is located in a position fit to detect a temperature of air drawn in from the intake opening 10D. The external temperature sensor ST3 may, for example, be a thermistor.

The internal temperature sensor ST1, the fixing temperature sensor ST2, and the external temperature sensor ST3 are examples of "temperature sensor". In other words, in this disclosure, the "temperature sensor" includes the internal temperature sensor ST1, the fixing temperature sensor ST2, and the external temperature sensor ST3.

The patch detection sensor SP detects a toner image (referred to as "patch" in the following description) transferred onto the conveyor belt 73. The patch detection sensor SP is located between the process unit 31 and the fixing unit 80 in the conveyance direction of a sheet S. More specifically, the patch detection sensor SP is opposed to the rear portion of the conveyor belt 73. The patch detection sensor SP may, for example, be a light-reflection type sensor including a light-emitting element and a light-receiving element. The image forming apparatus 1 corrects displacement and/or toner density based on the result of detection of the patch on the conveyer belt 73 as acquired by the patch detection sensor SP.

The controller 100 comprises a CPU, a RAM, a ROM, an input/output circuit, etc. The controller 100 performs various arithmetic processing based on programs or data stored in the ROM or other memories and thereby controls the feeder unit 20, the image forming unit 30, the conveyance unit 90, and the fan 13.

The controller 100 is capable of executing a printing process for forming an image on a sheet S. The controller 100 executes the printing process when it receives a printing job that includes a command to start printing and image data or the like.

During execution of the printing process, the controller 100 causes the fan 13 to rotate at a high speed if the rear cover 12 is closed, and to rotate at a low speed if the rear cover 12 is open. In this disclosure, during execution of the printing process, the controller 100 causes the fan 13 to rotate at the low speed even if the rear cover 12 is closed when a corrected internal temperature TI which will be described below is below a first threshold Tth1.

In other words, during execution of the printing process with the rear cover 12 closed, the controller 100 causes the fan 13 to rotate at the high speed if the corrected internal temperature TI is equal to or above the first threshold Tth1, and to rotate at the low speed if the corrected internal temperature TI is below the first threshold Tth1. Further, during execution of the printing process with the rear cover 12 open, the controller 100 causes the fan 13 to rotate at the low speed regardless of the corrected internal temperature T1.

The corrected internal temperature T1 is one example of a first temperature based on a detection result of a temperature sensor. In the present disclosure, the corrected internal temperature T1 is a temperature obtained by correcting a measurement value of the temperature sensor. More specifically, the corrected internal temperature T1 is a temperature obtained by correcting a measurement value of the internal temperature sensor ST1.

The controller 100 calculates, as the corrected internal temperature T1, a development roller temperature T11 which is a temperature of the development roller 61 of the process cartridge 60A located the nearest to the fixing unit 80, and a blade temperature T12 which is a temperature of the doctor blade 63 of the process cartridge 60A. The controller 100 calculates the development roller temperature T11 and the blade temperature T12 based on an internal temperature which is the measurement value of the internal temperature sensor ST1, an external temperature which is a measurement value of the external temperature sensor ST3, and an operating condition of the development roller 61 of the process cartridge 60A.

The controller 100 calculates the development roller temperature T11, for example, by an arithmetic expression that comprises a term including the internal temperature, and a term including the external temperature. The controller 100 calculates the blade temperature T12 by an arithmetic expression that comprises a term including the internal temperature, a term including the external temperature, and a term including an amount of heat produced by the doctor blade 63 (a predetermined constant) corresponding to the operating condition of the development roller 61 of the process cartridge 60A, acquired from the ROM or other memories.

Calculation of the development roller temperature T11 and the blade temperature T12 may be executed, for example, by a method disclosed in Japanese patent laid-open publication No. 2016-224374, thus a detail description of such method is omitted herein.

In a standby state waiting for input of a printing job, the controller 100 is configured to execute a ready mode that maintains the fixing unit 80 (heating portion 81) at a predetermined temperature, and a sleep mode which turns off the heater 81B of the heating portion 81. During execution of the ready mode, the temperature in the housing 10 may rise.

Thus, in the standby state, the controller 100 causes the fan 13 to rotate at the high speed if the corrected internal temperature T1 is equal to or above a sixth threshold Tth12. In the standby state, the controller 100 causes the fan 13 to rotate at the low speed if the corrected internal temperature T1 is below the sixth threshold Tth12 and equal to or above a seventh threshold Tth11 lower than the sixth threshold Tth12. Further, in the standby state, the controller 100 causes the fan 13 to stop if the corrected internal temperature T1 is below the seventh threshold Tth11.

The controller 100 is capable of executing a cooling process of prohibiting execution of the printing process and cooling the fixing unit 80 based on detection results of the temperature sensors ST1 to ST3. When the cooling process is executed, the controller 100 prohibits execution of the printing process, turns off the heater 81B of the fixing unit 80, and causes the fan 13 to rotate at the high speed. To be more specific, when the cooling process is executed, the controller 100 causes the fan 13 to rotate at the high speed regardless of whether the rear cover 12 is open or closed.

When execution of the printing process is prohibited in association with execution of the cooling process, for example, if there is any sheet S not yet fed, the controller 100 prohibits feeding of the sheet S to the image forming unit 30, and if there is any sheet S already being fed (any sheet S being conveyed), the controller 100 ejects the sheet S to the outside of the housing 10. The controller 100 executes the cooling process after suspending the execution of the printing process.

The controller 100 executes the cooling process if an external temperature T3 is equal to or above a third threshold Tth32. The external temperature T3 is an example of a third temperature based on the detection result of the external temperature sensor ST3, and is the measurement value of the external temperature sensor ST3 in this disclosure.

The controller 100 executes the cooling process if the corrected internal temperature T1 is equal to or above a fourth threshold Tth43. In this disclosure, the corrected internal temperature T1 is one example of a fourth temperature based on the detection result of the internal temperature sensor ST1. In this disclosure, the controller 100 determines that the corrected internal temperature T1 is equal to or above the threshold if at least one of the development roller temperature T11 and the blade temperature T12 is equal to or above the threshold. Further, the controller 100 determines that the corrected internal temperature T1 is below the threshold if both of the development roller temperature T11 and the blade temperature T12 are below the threshold, and determines that the corrected internal temperature T1 is equal to or below the threshold if both of the development roller temperature T11 and the blade temperature T12 are equal to or below the threshold.

The controller 100 executes the cooling process if a fixing unit temperature T2 is equal to or above a second threshold Tth22. The fixing unit temperature T2 is one example of a second temperature based on the detection result of the fixing temperature sensor ST2, and is a measurement value of the fixing temperature sensor ST2 in this disclosure.

Next, a process executed by the controller 100 will be described with reference to flowcharts.

Figure 2:
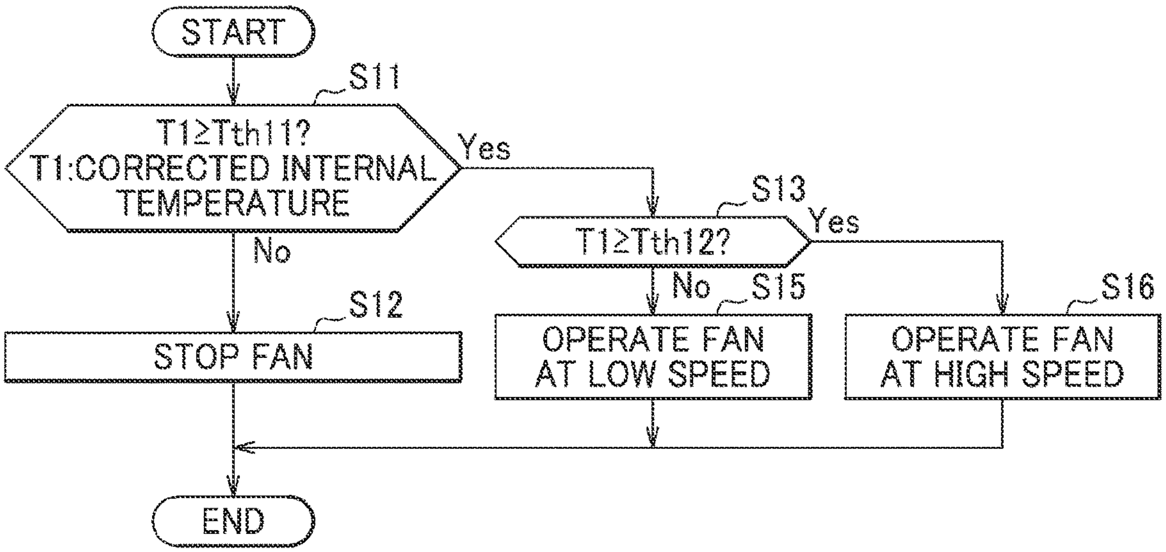
FIG. 2 is a flowchart showing a fan control process according to a first embodiment, executed during standby.

In a standby state waiting for input of a printing job, the controller 100 repeatedly executes a fan control process shown in FIG. 2.

As shown in FIG. 2, in the standby state, the controller 100 determines whether or not the corrected internal temperature T1 is equal to or above the seventh threshold Tth11 (S11). If the corrected internal temperature T1 is below the seventh threshold Tth11 (S11, No), the controller 100 stops the fan 13 (S12).

If the corrected internal temperature T1 is equal to or above the seventh threshold Tth11 (S11, Yes), the controller 100 determines whether or not the corrected internal temperature T1 is equal to or above the sixth threshold Tth12 higher than the seventh threshold Tth11 (S13). If the corrected internal temperature T1 is below the sixth threshold Tth12 (S13, No), the controller 100 causes the fan 13 to rotate at the low speed (S15). If the corrected internal temperature T1 is equal to or above the sixth threshold Tth12 (S13, Yes), the controller 100 causes the fan 13 to rotate at the high speed (S16).

Figure 3:
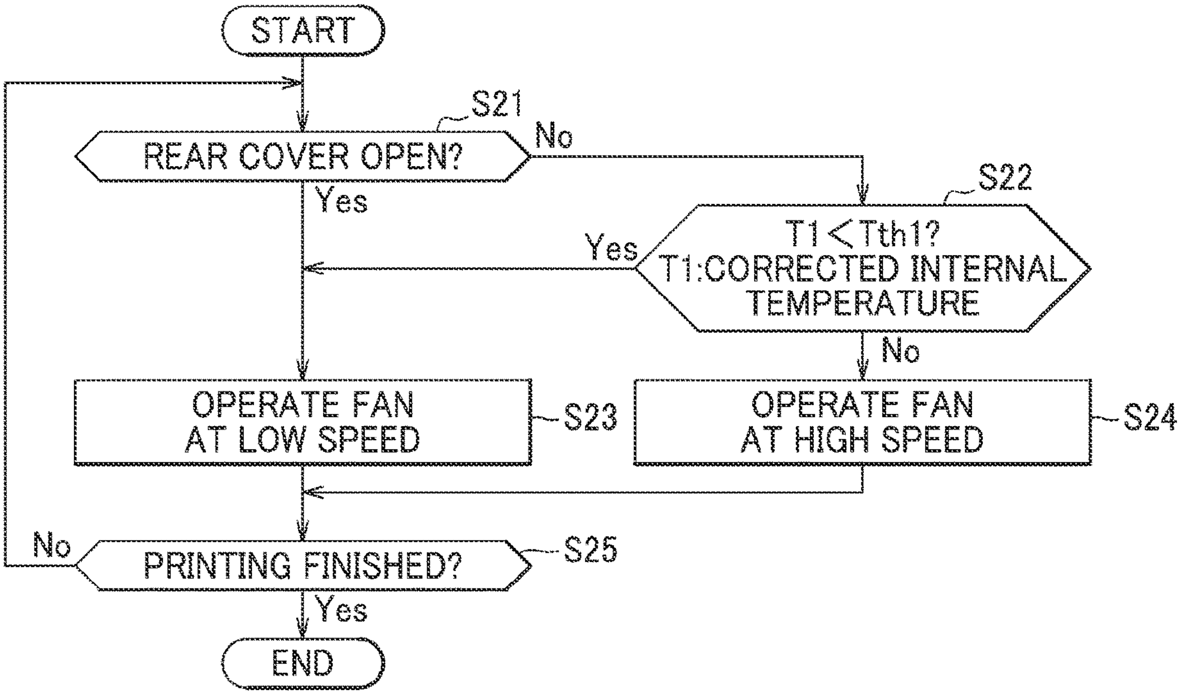
FIG. 3 is a flowchart showing a fan control process executed during printing.

Upon receipt of the printing job, the controller 100 executes an printing-in-progress fan control process shown in FIG. 3.

As shown in FIG. 3, upon receipt of the printing job, the controller 100 determines whether the rear cover 12 is open or closed based on a detection result of the second open/close sensor SC2 (S21). If the rear cover 12 is open (S21, Yes), the controller 100 causes the fan 13 to rotate at the low speed (S23).

If the rear cover 12 is closed (S21, No), the controller 100 determines whether or not the corrected internal temperature T1 is below the first threshold Tth1 (S22). If the corrected internal temperature T1 is lower that the first threshold Tth1 (S22, Yes), the controller 100 causes the fan 13 to rotate at the low speed (S23). If the corrected internal temperature T1 is equal to or above the first threshold Tth1 (S22, No), the controller 100 causes the fan 13 to rotate at the high speed (S24).

After causing the fan 13 to rotate, the controller 100 determines whether or not printing has been finished (S25). If printing has not been finished (S25, No), the controller 100 returns to step S21 and executes the process from thereon, and if printing has been finished (S25, Yes), the controller 100 ends the printing-in-progress fan control process.

Figure 4:
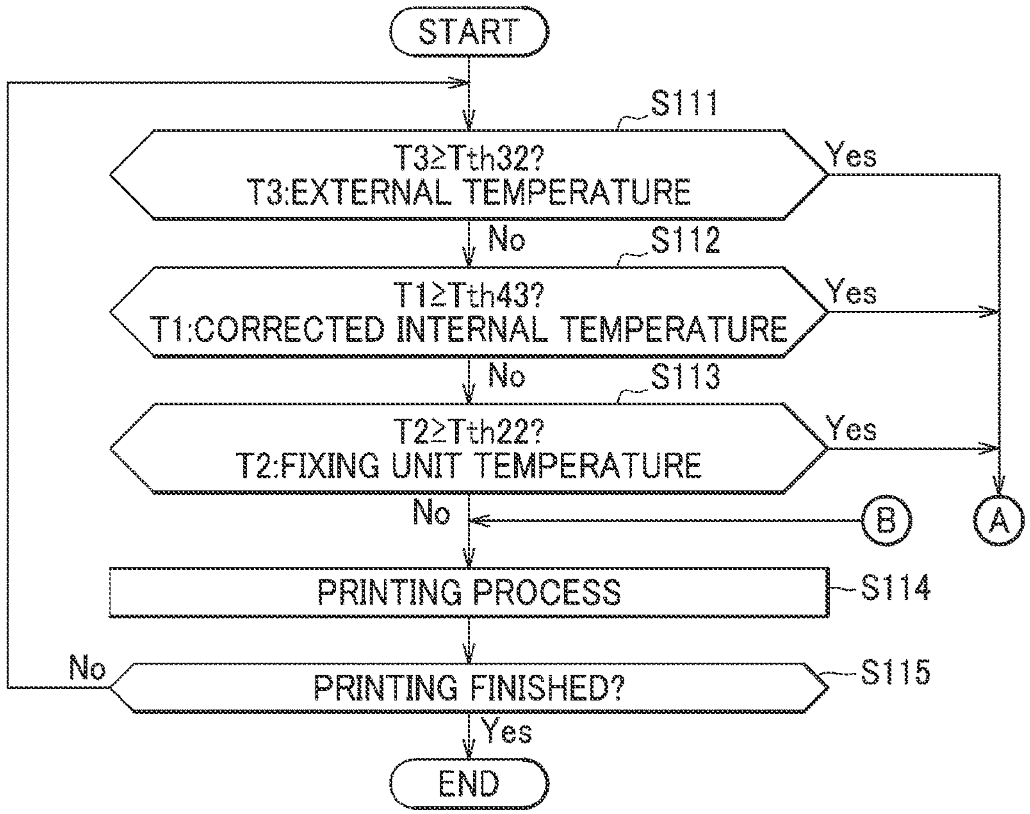
FIG. 4 is a flowchart showing an operation determination process according to the first embodiment.

Further, upon receipt of the printing job, the controller 100 executes an operation determination process shown in FIG. 4.

As shown in FIG. 4, upon receipt of the printing job, the controller 100 determines whether or not the external temperature T3 is equal to or above the third threshold Tth32 (S111). If the external temperature T3 is below the third threshold Tth32 (S111, No), the controller 100 determines whether or not the corrected internal temperature T1 is equal to or above the fourth threshold Tth43 (S112). If the corrected internal temperature T1 is below the fourth threshold Tth43 (S112, No), the controller 100 determines whether or not the fixing unit temperature T2 is equal to or above the second threshold Tth22 (S113). If the fixing unit temperature T2 is below the second threshold Tth22 (S113, No), the controller 100 executes the printing process (S114).

If the external temperature T3 is equal to or above the third threshold Tth32 (Yes) in step S111, if the corrected internal temperature T1 is equal to or above the fourth threshold Tth43 (Yes) in step S112, or if the fixing unit temperature T2 is equal to or above the second threshold Tth22 (Yes) in step S113, the controller 100 executes the cooling process.

Figure 5:
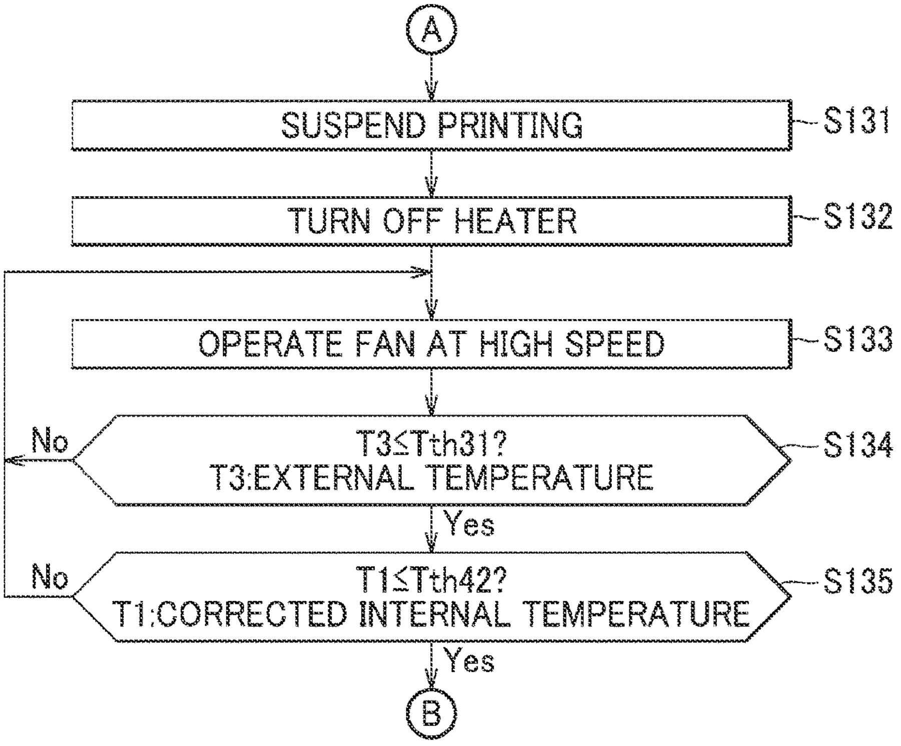
FIG. 5 is a flowchart showing a cooling process.

Specifically, as shown in FIG. 5, the controller 100 first suspends the printing process (S131). For example, if there is any sheet S that has not yet been fed, feeding of the sheet S to the image forming unit 30 is prohibited, and if there is any sheet S being conveyed, the sheet S is ejected outside the housing 10.

Subsequently, the controller 100 turns off the heater 81B of the fixing unit 80 (S132). Further, the controller 100 causes the fan 13 to rotate at the high speed regardless of whether the rear cover 12 is open or closed (S133). It is to be understood that the controller 100 temporarily ends the printing-in-progress fan control process shown in FIG. 3 when executing the cooling process.

Then, the controller 100 determines whether or not the external temperature T3 is equal to or below a threshold Tth31 lower than the third threshold Tth32 (S134). If the external temperature T3 is above the threshold Tth31 (S134, No), the controller 100 returns to step S133 and executes the process from there on.

If the external temperature T3 is equal to or below Tth31 (Yes) in step S134, the controller 100 determines whether or not the corrected internal temperature T1 is equal to or below a threshold Tth42 lower than the fourth threshold Tth43 (S135). If the corrected internal temperature T1 is above the threshold Tth42 (S135, No), the controller 100 returns to step S133 and executes the process from there on.

If the corrected internal temperature T1 is equal to or below the threshold Tth42 (Yes) in step S135, the controller 100 ends the cooling process. Subsequently, as shown in FIG. 4, the controller 100 restarts the printing process (S114). It is to be understood that the controller 100 restarts the printing-in-progress fan control process shown in FIG. 3 when the cooling process ends.

After execution of the printing process is started or restarted in step S114, the controller 100 determines whether or not printing has been finished (S115). If printing has not been finished (S115, No), the controller 100 returns to step 111 and executes the process from there on while continuing execution of the printing process. If printing has been finished (S115, Yes), the controller 100 ends the operation determination process.

According to the first embodiment described above, during execution of the printing process, the fan 13 is operated at the high speed if the rear cover 12 is closed. Thus, the fixing unit 80 and the process unit 31 can be cooled by an airflow created in the housing 10. Further, during execution of the printing process, the fan 13 is operated at the low speed if the rear cover 12 is open. Thus, a temperature rise of the process unit 31 can be restrained.

Figure 6:
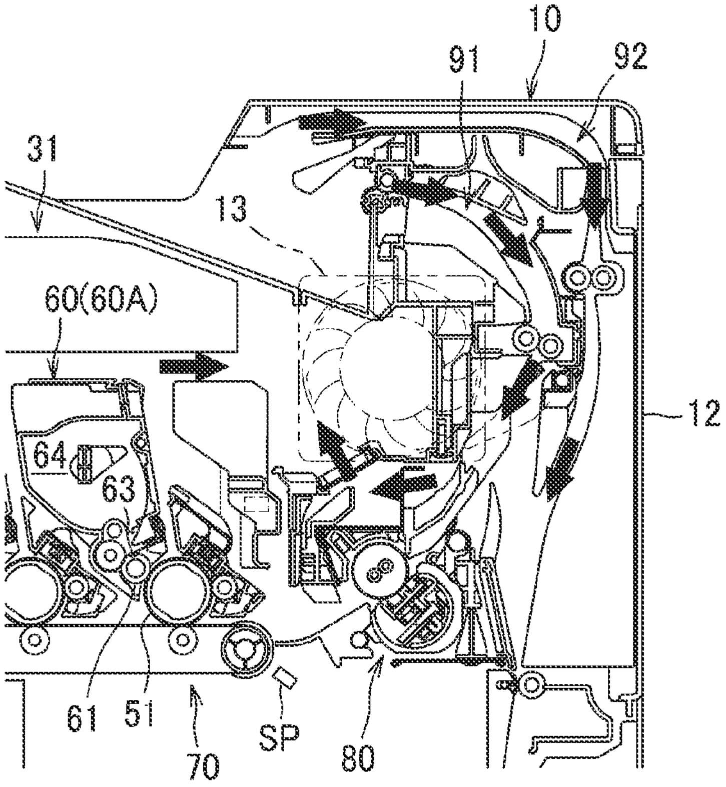
FIG. 6 is an illustration showing an airflow produced by a fan being caused to rotate at a high speed when a cover is closed.

Specifically, as shown in FIG. 6, by causing the fan 13 to rotate at the high speed during execution of the printing process with the rear cover 12 closed, air inside the housing 10 flows from the process unit 31 to the fan 13, and air outside the housing 10 flows into the housing 10 through the first path 91 and the second path 92.

The air flowing from the process unit 31 to the fan 13 absorbs heat produced in the process unit 31, and is forced out by the fan 13 to the outside of the housing 10. The air flowing into the housing 10 through the first path 91 and the second path 92 flows past the vicinity of the fixing unit 80, absorbs heat produced in the fixing unit 80, and is forced out by the fan 13 to the outside of the housing 10. As a result, it is possible to cool the fixing unit 80 and the process unit 31. Further, the air flowing into the housing 10 through the first path 91 and the second path 92 cools a sheet S (not shown) conveyed through the first path 91 or the second path 92.

Figure 7A:
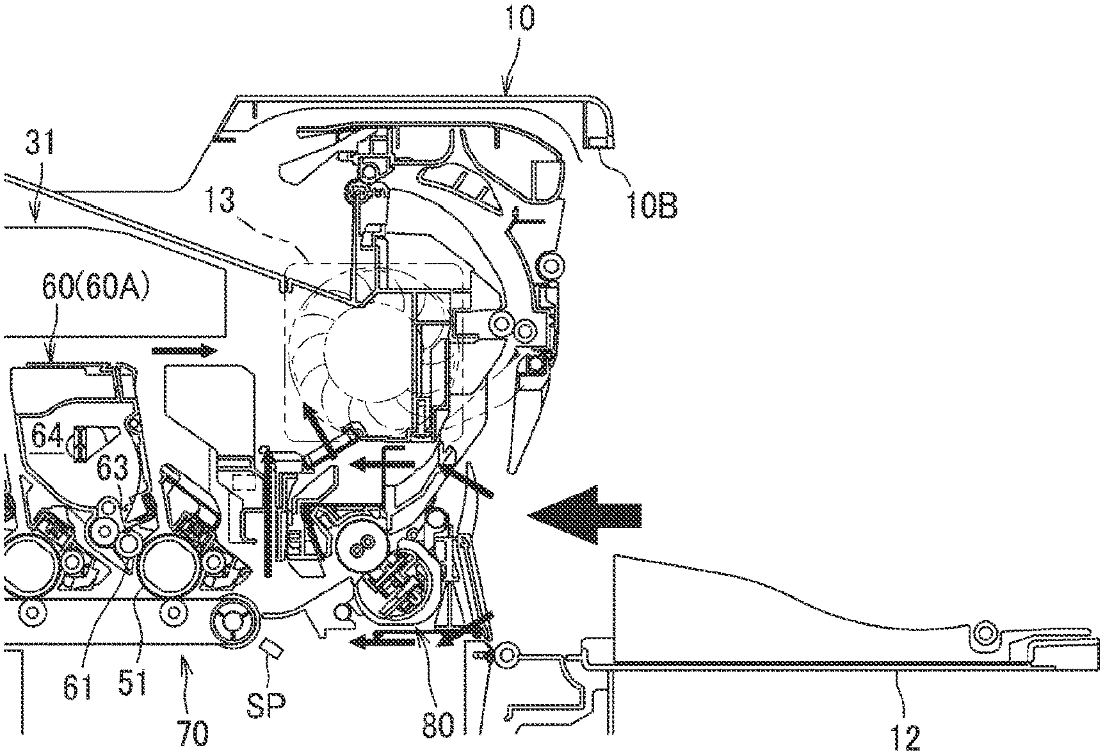
FIG. 7A is an illustration showing an airflow produced by a fan being caused to rotate at a low speed when the cover is open.
Figure 7B:
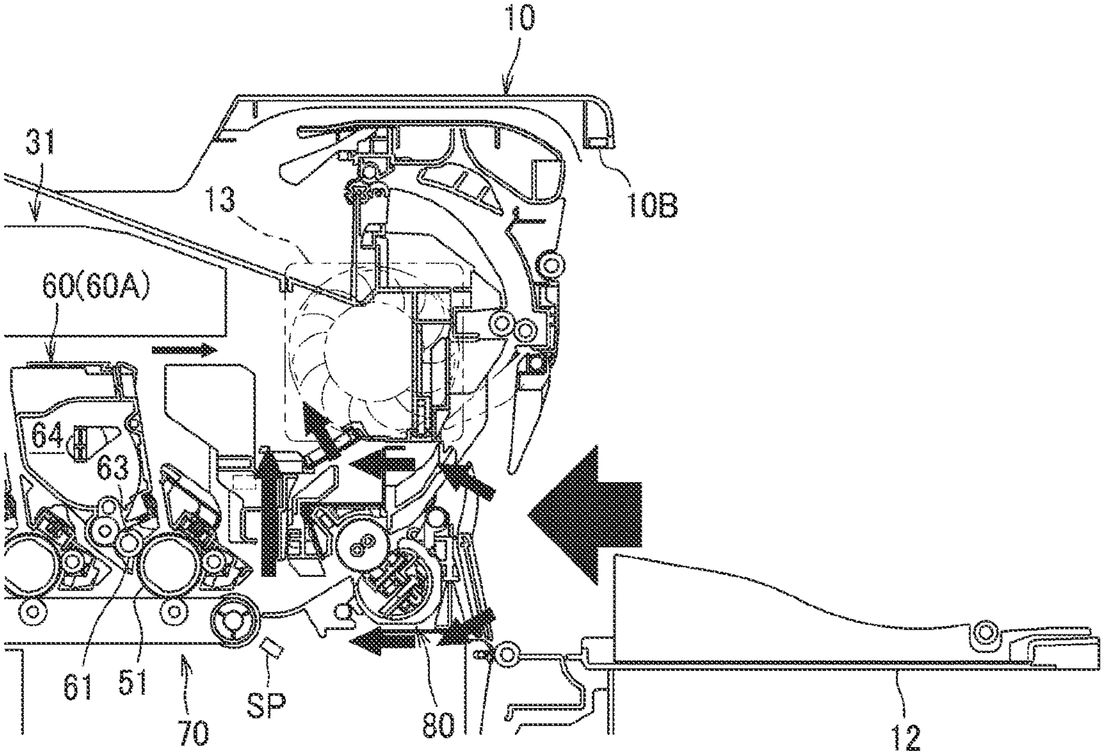
FIG. 7B is an illustration showing, as a comparative example, an airflow produced by the fan being caused to rotate at a high speed when the cover is open.

As shown in FIG. 7B as a comparative example, when the fan 13 is operated at the high speed during execution of the printing process with the rear cover 12 open, an amount of air flowing into the housing 10 through the rear opening 10B will increase. In such a case, air flowing into the housing 10 through the rear opening 10B flows past the vicinity of the fixing unit 80 and heats up. When this heated-up air flows into the process unit 31, there is a possibility that a temperature of the process unit 31 (particularly in the vicinity of the process cartridge 60A) and a temperature in the vicinity of the patch detection sensor SP will rise.

As shown in FIG. 7A, in this disclosure, by causing the fan 13 to rotate at the low speed during execution of the printing process with the rear cover 12 open, the amount of air flowing into the housing 10 through the rear opening 10B can be reduced while cooling the fixing unit 80. In this way, air flowing past and heated up in the vicinity of the fixing unit 80 can be restrained from flowing into the process unit 31. Therefore, a rise in temperature of the process unit 31 (particularly in the vicinity of the process cartridge 60A) or in the vicinity of the patch detection sensor SP can be restrained.

Since the fan 13 is caused to rotate at the low speed during printing even if the rear cover is closed when the corrected internal temperature T1 is low, such as below the first threshold Tth1, the fan 13 can be restrained from operating more than necessary while cooling the fixing unit 80 and the process unit 31.

Since the corrected internal temperature T1 is a temperature obtained by correcting the measurement value of the internal temperature sensor ST1, the fan 13 can be controlled more accurately compared to when the fan 13 is controlled based on a measurement value of the internal temperature sensor ST1.

Since the fan 13 is caused to rotate at the high speed when executing the cooling process, an adequate amount of airflow can be provided in the vicinity of the fixing unit 80. The fixing unit 80 can thereby be efficiently cooled.

Since the cooling process is executed if the fixing unit temperature T2 is equal to or above the second threshold Tth22, the cooling process can be executed when the temperature of the heating portion 81 is high. Thus, the temperature of the fixing unit 80 can be restrained from becoming too high. Therefore, the fixing unit 80 can be operated at a temperature below a predetermined temperature.

Since the cooling process is executed if the external temperature T3 is equal to or above a third threshold Tth32, the cooling process can be executed when the temperature outside the housing 10 is high.

Since the cooling process is executed if the corrected internal temperature T1 is equal to or above the fourth threshold Tth43, the cooling process can be executed when the temperature inside the housing 10 is high.

Since determination as to whether the rear cover 12 is open or closed is made based on a determination result of the second open/close sensor SC2, the determination as to whether the rear cover 12 is open or closed can be made in response to an actual open or close state of the rear cover 12.

Since the fan 13 is caused to rotate at the high speed during standby if the corrected internal temperature T1 is high, such as equal to or above the sixth threshold Tth12, the fixing unit 80 and process unit 31 can be cooled. Since the fan 13 is caused to rotate at the low speed if the corrected internal temperature T1 is moderate, such as below the sixth threshold Tth12 and equal to or above the seventh threshold Tth11, the fan 13 can be restrained from operating more than necessary without sacrificing the functionality of cooling the fixing unit 80 and the process unit 31. Further, since the fan is stopped if the corrected internal temperature T1 is low, such as below the seventh threshold Tth11, the fan 13 can be restrained from operating unnecessarily.

Next, a second embodiment of an image forming apparatus 1 will be described. In the following description, features different from the above-described embodiment will be described in detail, while the same features as those of the above-described embodiment will be identified by the same reference characters and descriptions thereof will be omitted as appropriate.

In this embodiment, the controller 100 is capable of executing a printing process which includes a normal printing process which is one example of a first printing process, and a half-speed printing process which is one example of a second printing process. The controller 100 causes a sheet S to be conveyed at a first conveyance speed during the normal printing process, and causes a sheet S to be conveyed at a second conveyance speed lower than the first conveyance speed during the half-speed printing process. In this embodiment, the second conveyance speed is approximately half the speed of the first conveyance speed. The normal printing process is approximately the same process as that of the printing process described in the first embodiment The controller 100 executes the normal printing process if the fixing unit temperature T2 is below a second threshold Tth22, and executes the half-speed printing process instead of the cooling process if the fixing unit temperature T2 is equal to or above a second threshold Tth22.

Further, the controller 100 executes the half-speed printing process if the corrected internal temperature T1 is equal to or above a fifth threshold Tth41. The corrected internal temperature T1 is one example of a fifth temperature based on a detection result of the internal temperature sensor ST1. The fifth threshold Tth41 is lower than the fourth threshold Tth43. The fifth threshold Tth41 is lower than the threshold Tth42 (see FIG. 5).

Next, a process executed by the controller 100 will be described with reference to flowcharts.

Figure 8:
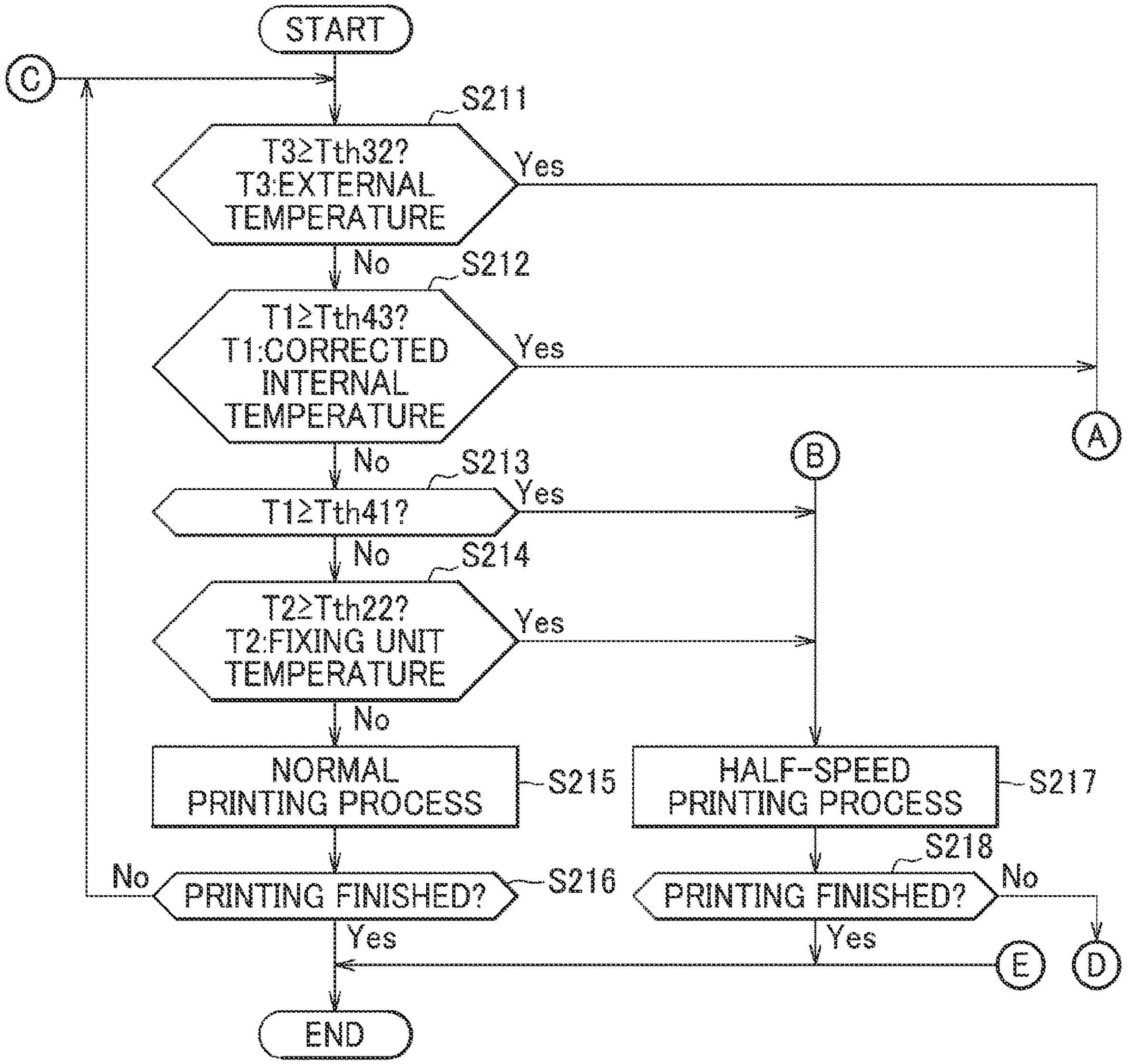
FIG. 8 is a flowchart showing an operation determination process according to a second embodiment.
Figure 9:
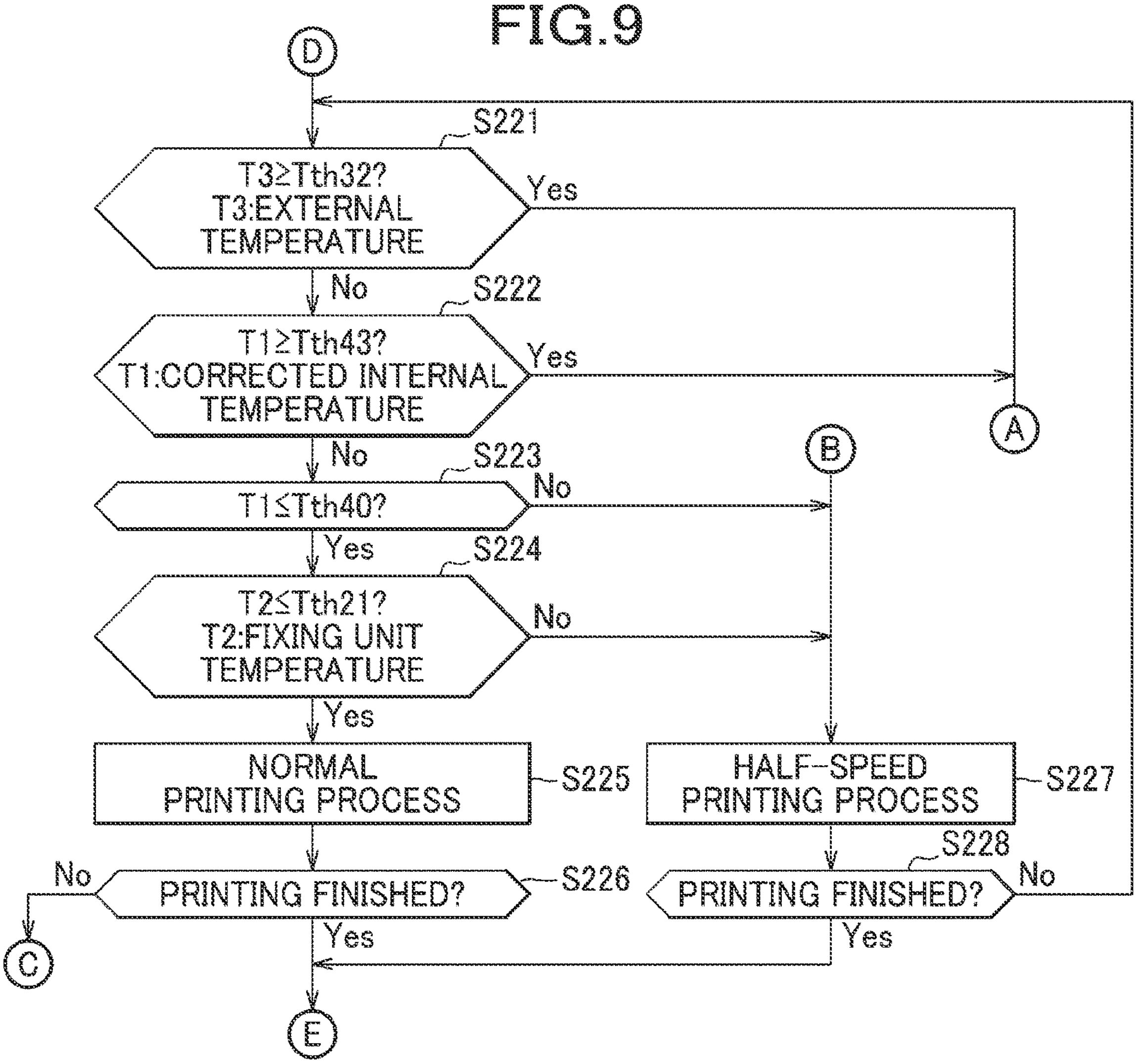
FIG. 9 is a flowchart, continued from the flowchart of FIG. 8, showing the operation determination process according to the second embodiment.

When a printing job is received, the controller 100 executes an operation determination process shown in FIG. 8 and FIG. 9.

As shown in FIG. 8, when a printing job is received, the controller 100 determines whether or not the external temperature T3 is equal to or above the third threshold Tth32 (S211). If the external temperature T3 is below the third threshold Tth32 (S211, No), the controller 100 determines whether or not the corrected internal temperature T1 is equal to or above the fourth threshold Tth43 (S212). If the corrected internal temperature T1 is below the fourth threshold Tth43 (S212, No), the controller 100 determines whether or not the corrected internal temperature T1 is equal to or above the fifth threshold Tth41 (S213). If the corrected internal temperature T1 is below the fifth threshold Tth41 (S213, No), the controller 100 determines whether or not the fixing unit temperature T2 is equal to or above the second threshold Tth22 (S214).

If the fixing unit temperature T2 is below the second threshold Tth22 (S214, No), the controller 100 executes the normal printing process (S215). Subsequently, the controller 100 determines whether or not printing has been finished (S216), and if not (S216, No), returns to step S211 and executes the process from there on while continuing execution of the printing process, and otherwise (S216, Yes), ends the operation determination process.

On the other hand, if the corrected internal temperature T1 is equal to or above the fifth threshold Tth41 (Yes in step S213), or if the fixing unit temperature T2 is equal to or above the second threshold Tth22 (Yes in step S214), the controller 100 executes the half-speed printing process (S217). Subsequently, the controller determines whether or not printing has been finished (S218), and if not (No in step S218), proceeds to step S221 (see FIG. 9) described below while continuing execution of the printing process, and if so (Yes in step S218), ends the operation determination process.

If the external temperature T3 is equal to or above the third threshold Tth32 (Yes) in step S211, or if the corrected internal temperature T1 is equal to or above the fourth threshold Tth43 (Yes in step S212), the controller 100 executes the cooling process (see FIG. 5). When the cooling process is finished, the controller 100 executes the half-speed printing process (S217).

After execution of the normal printing process is started in step S215, if printing has not been finished (S216, No) and the process returns to step S211, and if the corrected internal temperature T1 becomes equal to or above the fifth threshold Tth41 (Yes in step S213), or the fixing unit temperature T2 becomes equal to or above the second threshold Tth22 (Yes in step S214), the controller 100 makes a determination as to execute the half-speed printing process (S217) and executes the half-speed printing process from the next sheet S conveyed after the sheet S on which printing is currently being executed in the normal printing process.

After starting the half-speed printing process in step S217, if printing has not been finished (S218, No), the controller 100 determines, as shown in FIG. 9, whether or not the external temperature T3 is equal to or above the third threshold Tth32 (S221). If the external temperature T3 is below the third threshold Tth32 (S221, No), the controller 100 determines whether or not the corrected internal temperature T1 is equal to or above the fourth threshold Tth43 (S222). If the corrected internal temperature T1 is below the fourth threshold Tth43 (S222, No), the controller 100 determines whether or not the corrected internal temperature T1 is equal to or below a threshold Tth40 lower than the fifth threshold Tth41 (S223). If the corrected internal temperature T1 is above the threshold Tth40 (S223, No), the controller 100 continues execution of the half-speed printing process (S227).

If the corrected internal temperature T1 as determined in step S223 is equal to or below the threshold Tth40 (Yes), the controller 100 determines whether or not the fixing unit temperature T2 is equal to or below a threshold Tth21 lower than the second threshold Tth22 (S224). If the fixing unit temperature T2 is above the threshold Tth21 (S224, No), the controller 100 continues execution of the half-speed printing process (S227).

Subsequently, the controller 100 determines whether or not printing has been finished (S228), and if not (S228, No), returns to step 221 and executes the process from there on while continuing execution of the printing process, and if so (S228, Yes) ends the operation determination process (FIG. 8, END).

If the fixing unit temperature T2 is equal to or below the threshold Tth21 (S224, Yes), the controller 100 makes a determination to execute the normal printing process (S225). The controller 100 executes the normal printing process from the next sheet S conveyed after the sheet S on which printing is currently being executed in the half-speed printing process. After step S225, the controller 100 determines whether or not printing has been finished (S226), and if not (S226, No), returns to step S211 of FIG. 8 and executes the process from there on while continuing execution of the printing process, and if so (S226, Yes), ends the operation determination process (FIG. 8, END).

If the external temperature T3 is equal to or above the third threshold Tth32 (Yes in step S221 of FIG. 9), or if the corrected internal temperature T1 is equal to or above the fourth threshold Tth43 (Yes in step S222), the controller 100 executes the cooling process (see FIG. 5). After the cooling process is finished, the controller 100 executes the half-speed printing process (S227).

In the second embodiment described above, the half-speed printing process is executed (S217) if the fixing unit temperature T2 is equal to or above the second threshold Tth22 (FIG. 8, S214, Yes). Thus, the half-speed printing process in which heat of the fixing unit 80 is more easily absorbed by a sheet S can be executed when the temperature of the heating portion 81 is high. The temperature of the fixing unit 80 can thereby be restrained from becoming too high. As a result, the fixing unit 80 can be used at a temperature equal to or below the predetermined temperature.

Since the half-speed printing process is executed (S217) if the corrected internal temperature T1 is equal to or above the fifth threshold Tth41 (FIG. 8, S213, Yes), the half-speed printing process in which heat of the fixing unit 80 is more easily absorbed by a sheet S can be executed when the temperature in the housing 10 is high and the temperature of the heating portion 81 tends to rise. Accordingly, the temperature of the fixing unit 80 can be restrained from rising excessively. As a result, the fixing unit 80 can be used at a temperature below the predetermined temperature.

In this embodiment, the half-speed printing process is executed if the fixing unit temperature T2 is equal to or above the second threshold Tth22 or if the corrected internal temperature T1 is equal to or above the fifth threshold Tth41. However, for example, the half-speed printing process may be executed if the corrected internal temperature is equal to or above the fifth threshold, and the cooling process may be executed if the fixing unit temperature is equal to or above the second threshold.

Next, a third embodiment of an image forming apparatus 1 will be described.

In this embodiment, in a standby state waiting for input of a printing job, the controller 100 causes the fan 13 to rotate at the low speed even if the corrected internal temperature T1 is equal to or above the sixth threshold Tth12 when the rear cover 12 is open.

Figure 10:
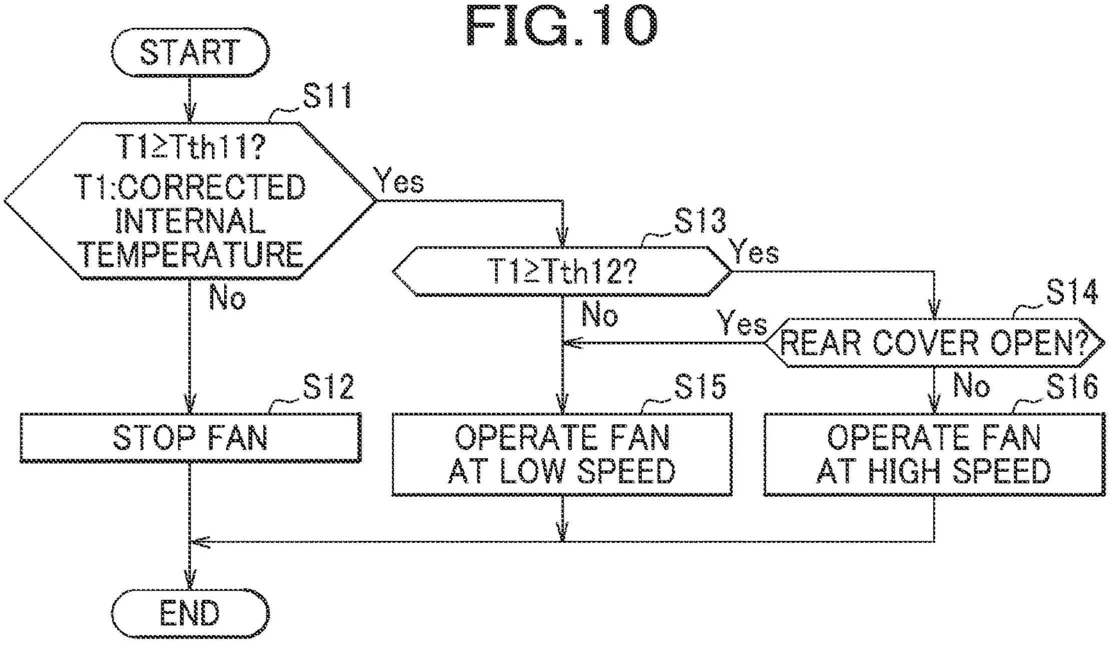
FIG. 10 is a flowchart showing a fan control process according to a third embodiment, executed during standby.

More specifically, as shown in FIG. 10, if the corrected internal temperature T1 is equal to or above the sixth threshold Tth12 (S13, Yes), the controller 100 determines whether the rear cover 12 is open or closed (S14). If the rear cover 12 is closed (S14, No), the controller 100 causes the fan 13 to rotate at the high speed (S16). On the other hand, if the rear cover 12 is open (S14, Yes), the controller 100 causes the fan 13 to rotate at the low speed (S15).

According to the third embodiment described above, the fan 13 is caused to rotate at the low speed during standby even if the corrected internal temperature T1 is equal to or above the sixth threshold Tth12 when the rear cover 12 is open. Thus, the amount of air flowing into the housing 10 through the rear opening 10B can be reduced. Since air flowing past and heated up in the vicinity of the fixing unit 80 can be restrained from flowing into the process unit 31, a rise in temperature of the process unit 31 can be restrained.

The image forming apparatus described above according to exemplary, non-limiting embodiments may be modified without limitation and implemented in various other forms as described below.

In the above-described embodiment, during execution of the printing process, if the corrected internal temperature T1 is below the first threshold Tth1, the fan 13 is caused to rotate at the low speed even if the rear cover 12 is closed. However, the fan may, for example, always be caused to rotate at the high speed if the cover is closed.

In the above-described embodiment, during execution of the cooling process, the fan 13 is always caused to rotate at the high speed. However, during execution of the cooling process, the fan speed may, for example, be switched from the high speed to the low speed or be gradually decreased in accordance with a degree of cooling of the fixing unit.

In the above-described embodiment, the fixing unit temperature T2 which is the measurement value of the fixing temperature sensor ST2 is given as an example of the second temperature based on a detection result of the fixing temperature sensor ST2. However, the second temperature may, for example, be a temperature obtained by correcting the measurement value of the fixing temperature sensor.

In the above-described embodiment, the external temperature T3 which is the measurement value of the external temperature sensor ST3 is given as an example of the third temperature based on a detection result of the external temperature sensor ST3. However, the third temperature may, for example, be a temperature obtained by correcting the measurement value of the external temperature sensor. It is to be understood that the location of the external temperature sensor ST3 described above is one example. The external temperature sensor ST3 may be located in a position different from that described above.

In the above-described embodiment, the corrected internal temperature T1 which is a temperature obtained by correcting the measurement value of the internal temperature sensor ST1 is given as an example of the fourth temperature based on a detection result of the internal temperature sensor ST1. However, the fourth temperature may, for example, be the measurement value of the internal temperature sensor. The same can be said regarding the fifth temperature. It is to be understood that the location of the internal temperature sensor ST1 described above is one example. The internal temperature sensor ST1 may be located in a position different from that described above. The internal temperature sensor may, for example, be located in the process cartridge 60A described above.

In the above-described embodiment, the corrected internal temperature T1 which is a temperature obtained by correcting the measurement value of the internal temperature sensor ST1 is given as an example of the first temperature based on a detection result of the temperature sensor. However, the first temperature may, for example, be the measurement value of the internal temperature sensor. The first temperature may be the measurement value of the fixing temperature sensor or a temperature obtained by correcting the measurement value of the fixing temperature sensor.

Further, the first temperature may be the measurement value of the external temperature sensor or a temperature obtained by correcting the measurement value of the external temperature sensor.

Although the corrected internal temperature T1 is adopted in the above-described embodiment as an example of the first temperature and as an example of the fourth temperature, this is not essential. Although the first temperature and the fourth temperature are the same temperature in the above-described embodiment, these temperatures may be different temperatures. The same can be said regarding the first temperature and the fifth temperature.

In the above-described embodiment, the image forming apparatus 1 comprises a second open/close sensor SC2 (open/close detection sensor), and the controller 100 determines whether the rear cover 12 is open or closed based on a detection result of the second open/close sensor SC2. However, in an image forming apparatus which does not comprise an open/close detection sensor, the controller may, for example, be configured to determine that the rear cover is open if a user selects a printing mode in which a sheet is ejected from the rear opening.

In the above-described embodiment, the internal temperature sensor ST1, the fixing temperature sensor ST2, and the external temperature sensor ST3 are given as examples of a temperature sensor. However, the temperature sensor may include only two or only one of the internal temperature sensor ST1, the fixing temperature sensor ST2, and the external temperature sensor ST3. Further, the temperature sensor may further include an additional temperature sensor other than the temperature sensors ST1 to ST3 of the above-described embodiment.

In the above-described embodiment, the rear opening 10B and the rear cover 12 provided in the rear portion of the housing are given as examples of an opening and a cover of the housing. However, as long as the cover in an open state enables a sheet with an image formed thereon to be ejected through an opening of the housing, the cover is not limited to a cover provided in the rear portion of the housing. The opening and the cover of the housing may, for example, be an opening and a cover provided in an upper portion of the housing.

In the above-described embodiment, only one fan 13 is shown. However, any number of fans may be provided, as appropriate. That is, a plurality of fans may be provided. The image forming apparatus may, for example, further comprise a second fan for forcing air into the housing other than the fan caused to rotate at the low speed during execution of the printing process when the cover is open.

The configuration of the process unit described above is one example. In the above-described embodiment, the exposure unit 40 is configured, for example, to emit a light beam on a surface of the photosensitive drum 51 to thereby expose the surface of the photosensitive drum to light. However, the exposure unit may be configured to comprise an exposure head including an array of a plurality LEDs, and to emit light from the LEDs on a surface of the photosensitive drum to thereby expose the surface of the photosensitive drum to light In the above-described embodiment, the transfer unit 70 comprises a conveyor belt 73 which conveys a sheet S in combination with the photosensitive drums 51. However, the transfer unit may, for example, comprise an intermediate transfer belt, and a secondary transfer roller for transferring a toner image formed on the intermediate transfer belt onto a sheet, instead of the transfer belt.

In the above-described embodiment, the drum unit 50 comprises photosensitive drums 51 which are drum-shaped photoconductors. However, the drum unit may, for example, comprise belt-shaped photoconductors.

In the above-described embodiment, the process unit 31 comprises the drum unit 50, and the process cartridges 60 installable into and removable from the drum unit 50. However, the process unit may, for example, comprise a unit in which the drum unit 50 and the process cartridges 60 of the above-described embodiment are integrally formed, so that they are not detachable from the unit.

The configuration of the fixing unit described above is one example. In the above-described embodiment, the heating portion 81 is configured, for example, to include the heating roller 81A. However, the heating portion may be configured to include an endless belt to be heated by a heater, instead of a heating roller. Further, in the above-described embodiment, the pressure portion 82 is configured to include the endless belt, the pressure pad, the holder, the belt guide, etc. However, the pressure portion may, for example, be a pressure roller which includes a metal core and an elastic layer formed around the metal core.

In the above-described embodiment, the image forming apparatus 1 is a color printer. However, the image forming apparatus may, for example, be a monochrome printer. Further, the image forming apparatus is not limited to a printer and may, for example, be a copying machine or a multifunction device.

The elements described in the above embodiment and its modified examples may be implemented selectively and in combination.

What is claimed is:

1. An image forming apparatus comprising:

a housing having an opening;

a cover configured to open the opening in an open state and to close the opening in a close state, the cover in the open state being configured to allow a sheet with a toner image fixed thereon to be ejected through the opening and to be received on the cover, the cover in the close state being configured to guide the sheet with the toner image fixed thereon toward a discharge tray;

a photosensitive drum configured to form a toner image onto a sheet;

a heater configured to heat the sheet to fix the toner image on the sheet, the heater being located between the cover in the close state and the photosensitive drum;

a fan configured to force air out of the housing; and a controller configured to execute a printing process for forming a toner image on a sheet, wherein during execution of the printing process, the controller is configured to cause the fan to rotate at a first speed if the cover is in the closed state to guide the sheet toward the discharge tray, and to rotate at a second speed lower than the first speed if the cover is in the open state to receive the sheet on the cover.

2. The image forming apparatus according to claim 1, further comprising a temperature sensor, wherein during execution of the printing process, the controller is configured to cause the fan to rotate at the second speed when a temperature based on a detection result of the temperature sensor is below a temperature threshold even if the cover is in the closed state.

3. The image forming apparatus according to claim 2, wherein the temperature based on the detection result of the temperature sensor is a temperature obtained by correcting a measurement value of the temperature sensor.

4. The image forming apparatus according to claim 1, further comprising a temperature sensor, wherein the controller is configured to execute a cooling process of prohibiting execution of the printing process and cooling the heater based on a detection result of the temperature sensor; and wherein the fan is caused to rotate at the first speed during execution of the cooling process.

5. The image forming apparatus according to claim 4, wherein the temperature sensor includes a fixing temperature sensor configured to detect a temperature of the heater, and wherein the controller is configured to execute the cooling process if a temperature based on a detection result of the fixing temperature sensor is equal to or above a fixing temperature threshold.

6. The image forming apparatus according to claim 4, wherein the temperature sensor includes a fixing temperature sensor configured to detect a temperature of the heater, wherein the printing process includes a first printing process in which a sheet is conveyed at a first conveyance speed, and a second printing process in which a sheet is conveyed at a second conveyance speed lower than the first conveyance speed; and wherein the controller is configured to execute the second printing process if a temperature based on a detection result of the fixing temperature sensor is equal to or above a fixing temperature threshold.

7. The image forming apparatus according to claim 4, wherein the temperature sensor includes an external temperature sensor that detects a temperature outside the housing, and wherein the controller is configured to execute the cooling process if a temperature based on a detection result of the external temperature sensor is equal to or above an external temperature threshold.

8. The image forming apparatus according to claim 4, wherein the temperature sensor includes an internal temperature sensor that detects a temperature inside the housing, and wherein the controller is configured to execute the cooling process if a temperature based on a detection result of the internal temperature sensor is equal to or above an internal temperature threshold.

9. The image forming apparatus according to claim 4, wherein the temperature sensor includes an internal temperature sensor that detects a temperature inside the housing, wherein the printing process includes a first printing process in which a sheet is conveyed at a first conveyance speed, and a second printing process in which a sheet is conveyed at a second conveyance speed lower than the first conveyance speed; and wherein the controller is configured to execute the second printing process if a temperature based on a detection result of the internal temperature sensor is equal to or above an internal temperature threshold.

10. The image forming apparatus according to claim 1, further comprising an open/close detection sensor configured to detect opening and closing of the cover, and wherein the controller is configured to determine whether the cover is in the open state or in the close state based on a detection result of the open/close detection sensor.

11. The image forming apparatus according to claim 1, further comprising a temperature sensor, wherein in a standby state waiting for input of a printing job, the controller is configured to cause the fan to rotate at the first speed if a temperature based on a detection result of the temperature sensor is equal to or above a high temperature threshold, to rotate at the second speed if the temperature based on the detection result of the temperature sensor is below the high temperature threshold and equal to or above a low temperature threshold lower than the high temperature threshold, and to stop if the temperature based on the detection result of the temperature sensor is below the low temperature threshold.

12. The image forming apparatus according to claim 11, wherein the controller is configured to cause the fan to rotate at the second speed even if the temperature based on the detection result of the temperature sensor is equal to or above the high temperature threshold when the cover is open.

13. An image forming apparatus comprising:

a housing having an opening;

a photosensitive drum configured to form a toner image onto a sheet;

a heater configured to heat the sheet to fix the toner image on the sheet;

a discharge tray;

a cover configured to open the opening in an open state and to close the opening in a close state, the cover being configured to eject the sheet with the toner image fixed thereon through the opening and to receive the sheet with the toner image fixed thereon on the cover when the cover is in the open state, and to guide the sheet with the toner image fixed thereon toward the discharge tray when the cover is in the close state;

a fan configured to force air out of the housing when rotated; and a controller configured to control the fan to rotate at a first speed when the cover closes the opening to guide the sheet toward the discharge tray, and to rotate at a second speed lower than the first speed when the cover opens the opening to receive the sheet on the cover.

14. The image forming apparatus according to claim 13, further comprising a temperature sensor, wherein the controller is configured to control the fan to rotate at the second speed when a temperature based on a detection result of the temperature sensor is below a temperature threshold even if the cover is in the close state.

15. The image forming apparatus according to claim 13, further comprising a temperature sensor, wherein the controller is configured to execute a cooling process of prohibiting execution of a printing process and cooling the heater based on a detection result of the temperature sensor; and wherein the controller is configured to control the fan to rotate at the first speed during execution of the cooling process.

16. The image forming apparatus according to claim 13, further comprising an open/close detection sensor configured to detect opening and closing of the cover, and wherein the controller is configured to determine whether the cover is in the open state or in the close state based on a detection result of the open/close detection sensor.

17. The image forming apparatus according to claim 13, further comprising a temperature sensor, wherein in a standby state waiting for input of a printing job, the controller is configured to control the fan to rotate at the first speed when a temperature based on a detection result of the temperature sensor is equal to or above a high temperature threshold, to rotate at the second speed when the temperature based on the detection result of the temperature sensor is below the high temperature threshold and equal to or above a low temperature threshold lower than the high temperature threshold, and to stop when the temperature based on the detection result of the temperature sensor is below the low temperature threshold.

18. An image forming apparatus comprising:

a housing having an opening;

a cover configured to open the opening in an open state and to close the opening in a close state, the cover in the open state being configured to allow a sheet with a toner image fixed thereon to be ejected through the opening;

a photosensitive drum configured to form a toner image onto a sheet;

a heater configured to heat the sheet to fix the toner image on the sheet, the heater being located between the cover in the close state and the photosensitive drum;

a fan configured to force air out of the housing;

a controller configured to execute a printing process for forming a toner image on a sheet; and a temperature sensor, wherein during execution of the printing process, the controller is configured to cause the fan to rotate at a first speed if the cover is in the closed state, and to rotate at a second speed lower than the first speed if the cover is in the open state, and wherein during execution of the printing process, the controller is configured to cause the fan to rotate at the second speed when a temperature based on a detection result of the temperature sensor is below a temperature threshold even if the cover is in the closed state.

19. The image forming apparatus according to claim 18, wherein the temperature based on the detection result of the temperature sensor is a temperature obtained by correcting a measurement value of the temperature sensor.

* * * * *